May 28, 1968     F. D. LEWIS, SR     3,385,307
LINEAR AND ANGULAR RESPONSIVE ACCELEROMETER
ANTI-SKID DEVICE
Filed Nov. 17, 1965     2 Sheets-Sheet 2

INVENTOR.
FRANK D. LEWIS, SR.
BY
George C. Sullivan
Agent

United States Patent Office 3,385,307
Patented May 28, 1968

3,385,307
LINEAR AND ANGULAR RESPONSIVE
ACCELEROMETER ANTI-SKID DEVICE
Frank D. Lewis, Sr., Atlanta, Ga., assignor to Lockheed
Aircraft Corporation, Burbank, Calif.
Filed Nov. 17, 1965, Ser. No. 508,234
12 Claims. (Cl. 137—38)

This invention relates to improvements in anti-skid devices for vehicles and more particularly to such a device for vehicles that move on tires by which maximum braking of the vehicle is effected without an accompanying slippage or skid to thereby prevent undue wear to the vehicle's tires.

The present invention is predicated on the known and previously used relationship between the concurrent linear and angular decelerations of a wheel under ideal conditions of complete rolling contact with a supporting surface without slippage and proposes a mechanical device to eliminate skids that constantly compares these decelerations to the end that a deviation thereof from the known relationship may be employed to modulate the effective pressure of the brakes accordingly.

Electric and electronic devices have been favored in antiskid systems, although it is generally recognized that mechanical devices have several advantages, notably a shorter response time and reliability. The reason for this is primarily because of the space and size limitations available within the wheel in which such a device is required or desired to be accommodated and the relatively complex structure of mechanical designs. Since there are two separate and distinct factors involved, viz., linear deceleration and angular deceleration of the wheel, these must be sensed simultaneously and their relationship continuously compared. So long as the rolling relationship exists, no correction to the brake pressure is required. When the relationship deviates from the rolling condition, the brake pressure must be modulated in order to maintain maximum brake pressure on the wheel without skidding. Both gyros and inertia devices have been heretofore employed for this purpose. In any case, accurate balancing and sensitivity are required as well as an integration of the interconnection of the different degrees of freedom and it is most desirable that the system be located coaxially with the wheel itself.

The present invention therefore, recognizing the several advantages of the mechanical anti-skid device over the relatively less complicated (structurally) electric or electronic units, contemplates an improved mechanism that satisfies all the requirements, such as compactness, sensitivity, durability, etc., for a successful mechanical anti-skid device. By "successful" is meant primary one that is competitive with the presently preferred electric or electronic units. At the same time this mechanical device is superior to its electric or electronic counterparts in response time and reliability.

The device herein proposed is based on a design concept that materially simplifies the structural components and reduces the number and size of their associated parts by combining the linear and angular decelerating sensing and comparing functions into a single unit. This composite unit in turn is so designed and arranged that it does not readily become distorted in service and yet maintains the required high degree of sensitivity reducing its maintenance to a minimum.

In its broadest aspects the present anti-skid device comprises a mechanism that is sensitive to deviations in the linear and angular decelerations of one or more wheels of a vehicle from the known relationship thereof or a preestablished norm corresponding to complete rolling contact with the ground or supporting surface without slippage or skid. This mechanism includes basically a composite linear and angular accelerometer connected to one or more of the wheels so as to rotate in unison therewith and at the same time be capable of limited relative lateral movement. By providing a control that is responsive to this lateral movement, it is possible to adjust the pressure regulating device customarily associated with and forming a part of the brake system of the vehicle accordingly.

With the above general objects in view as well as other more specific objects as will be apparent, this invention consists in the construction, combination and arrangement of parts all as hereinafter more clearly described, claimed and illustrated in the accompanying drawings wherein:

Figure 1:
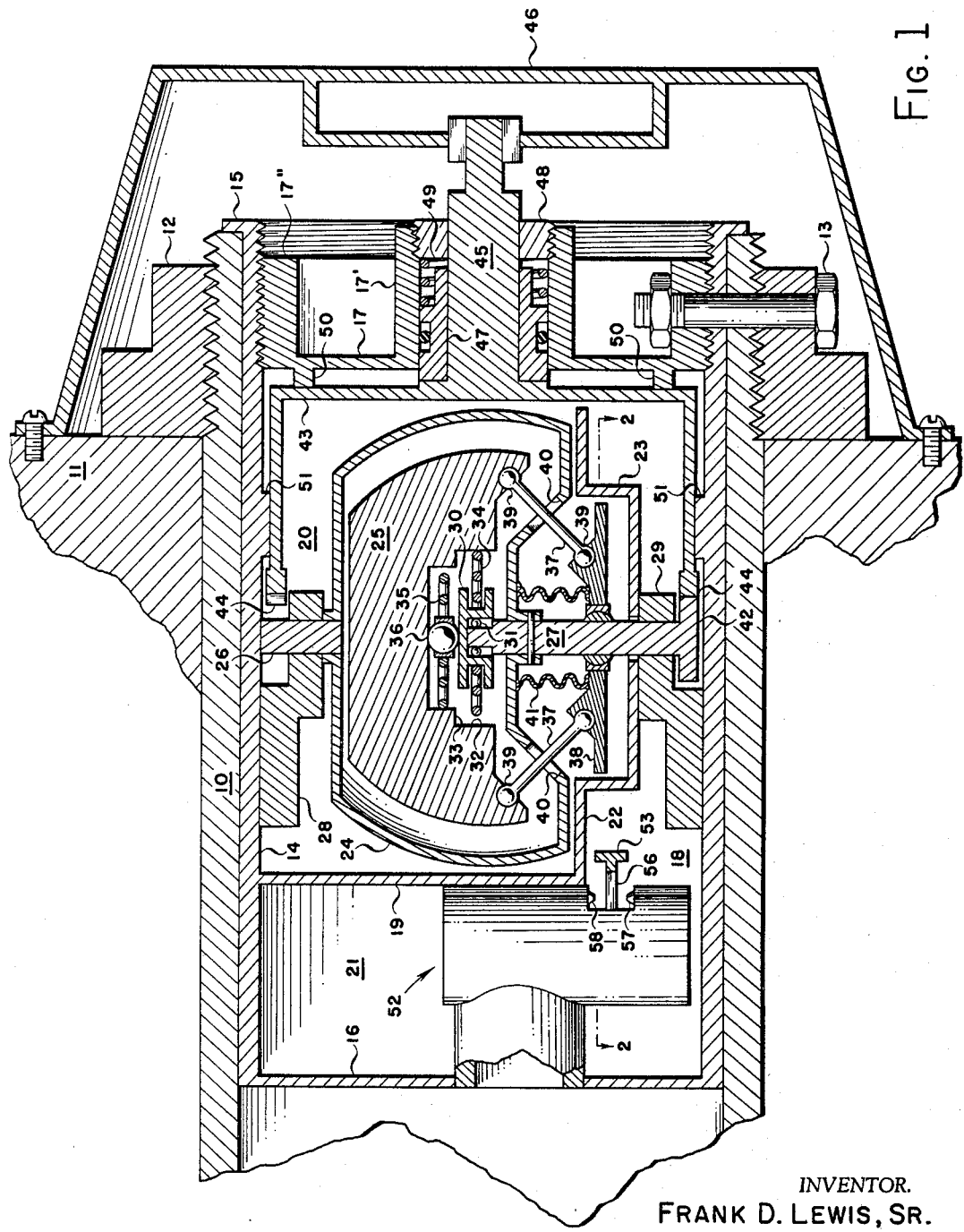
FIGURE 1 is a transverse section taken through a portion of the hub or axle of a wheel on a vehicle to show generally and to some extent schematically to facilitate an understanding of the invention a mechanical anti-skid device designed and constructed in accordance with the teachings hereof as it would be operatively mounted therein, only a fragment of the associated wheel being shown.
Figure 2:
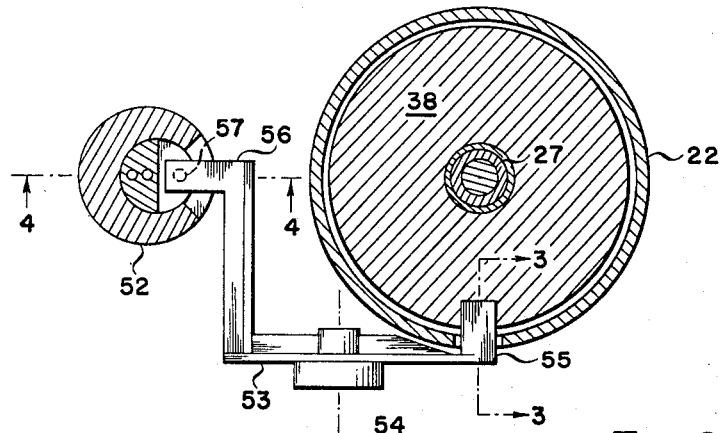
FIGURE 2 is a section taken along line 2—2 of FIGURE 1 to show the interconnecting link between the composite linear and angular accelerometer and the control to the pressure regulating device of the brake system.
Figure 3:
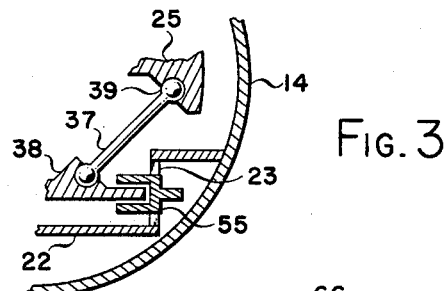
FIGURE 3 is a section taken along line 3—3 of FIGURE 2.
Figure 5:
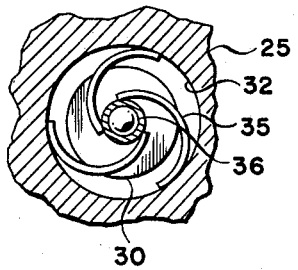
FIGURE 5 is a detail of the centering means employed between the operating elements of the composite linear and angular accelerator.
Figure 4:
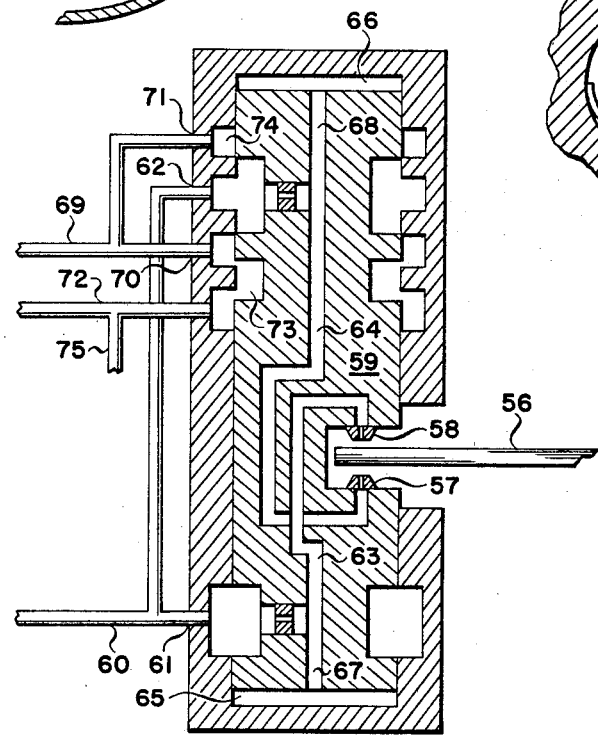
FIGURE 4 is a section taken along line 4—4 of FIGURE 2 to show generally the structure of the control to the pressure regulating device of the brake system.

Referring more particularly to the drawings, 10 designates the outer end portion of a hub or axle on which a wheel 11 is mounted for free and unrestricted rotation in conventional manner. Thus mounted, the wheel 11 is secured in place on its outer side by a retaining nut 12 and one or more lock bolts 13. The mechanical anti-skid device as herein proposed is adapted to seat within this end of the axle 10 and be secured thereto by suitable fastening means which may be the bolt or bolts 13. To this end the device comprises a generally cylindrical casing 14 having an outside diameter substantially equal to the internal diameter of the axle 10 and terminates in an outwardly projecting radial flange 15 adapted to abut the outer edge of the axle 10 when the device is fully seated therein.

At its other or inner end the casing 14 terminates in an end wall 16 which cooperates with the peripheral wall of the casing 14 and a similar end wall 17 adjacent the flange 15 to define a chamber 18. The end wall 17 is pierced centrally by an opening defined by an integral collar 17' projecting outwardly of the wall 17 and a similar collar or flange 17" at and around its periphery. The outer surface of the flange 17" is threaded for coaction with internal threads on the adjacent end of the casing 14 whereby the wall 17 is removable and replaceable in the casing 14 for purposes of access to the chamber 18.

Mounted within the outer end of the chamber 18 is a generally cylindrically shaped partition 19 disposed at right angles to the casing 14 that substantially divides the chamber 18 into subchambers 20 and 21. This partition 19 is thereby disposed in a vertical plane with the upper end immovably secured in appropriate manner to the wall of the casing 14 and its lower end terminating short of the opposite wall to which it is also immovably secured by means of and through an end wall 22. This wall 22 is recessed centrally as at 23 for reasons to become apparent.

Rotatably mounted within the subchamber 20 is a hollow case 24 that is preferably frusto-conical or frustohemispherical and in which a similarly shaped mass 25 is disposed in a suspended position concentrically therein. To this end a pair of aligned vertically disposed shafts 26 and 27 are provided being disposed substantially in the longitudinal center of the subchamber 20. The upper shaft 26 is immovably secured to the casing 14 through a mounting fixture 28 and terminates in the plane of the associated wall of the case 24, which is connected thereto and freely rotatable thereon through any conventional means. The lower shaft 27 is rotatably secured to the casing 14 through a similar fixture 29 and terminates within the case 24, passing through openings provided therefor in the wall 22 and the associated wall of the casing 24 to which it is immovably secured in any suitable fashion.

At its inner extremity, the shaft 27 carries a pivot table 30 rotatably mounted thereon preferably through antifriction means such as roller bearings 31 and disposed within a central cutout 32 provided therefor in the mass 25. This cutout 32 has a base diameter appreciably less than that at its outer end creating a side wall that is stepped as at 33 to accommodate and secure therein the corresponding ends of a pair of resilient members such as the centering springs 34 and 35. Centrally, the spring 34 is secured to the periphery of the pivot table 30 and the spring 35 is secured to the surface of a ball 36 disposed between the base wall of the mass 25 and the adjacent face of the pivot table 30. Thus, the mass 25 is maintained concentrically of the shafts 26 and 27 within the case 24.

Also assisting in this disposition of the mass 25 is a plurality of spokes 37 connecting the lower end of the mass 25 adjacent its outer surface to a wobble plate 38 slidably mounted on the shaft 27 between the wall 22 and the associated wall of the case 24. The several spokes 37 are thus concentrically disposed about the shaft 27 and each terminates at its opposite ends in a ball and socket connection 39 with the mass 25 and plate 38. Portions of the wall of the case 24 are slotted as at 40 to permit the passage of the spokes 37 therethrough.

The wobble plate 38 is connected to the case 24 by means of and through a resilient torsion resisting member such as a bellows 41 whereby relative movement therebetween is limited to the linear plane. This bellows is disposed around the shaft 27 and secured at its opposite ends in any conventional manner to the adjacent sides of the case 24 and plate 30.

At its outer or lower end, the shaft 27 terminates short of the casing 14 and carries a gear 42 keyed thereto and disposed in the plate of and adapted to be driven by a rotary drum 43 mounted on the end wall 17 and projecting from the inner surface thereof. This drum 43 is a cup-shaped member with teeth 44 formed on its lip for constant engagement with the gear 42 constituting a drive gear. Projecting outwardly from the base wall of the drum 43 is a shaft 45, which passes through the opening in the wall 17 defined by the collar 17' with its outer end formed or otherwise adapted to be removably secured in an appropriate manner to the inner face of a hub cap 46. The hub cap 46 in turn is adapted to be removably secured to the wheel 11 for rotation in unison therewith.

The outside diameter of the shaft 45 is appreciably less than the inside diameter of the collar 17' to thereby establish a space therebetween sufficient to accommodate a seal 47, which is preferably formed of conventional shaft and seal materials and incorporates a standard O-ring between its surface and the adjacent surface of the collar 17'. The seal 47 is maintained in its operative position abutting the adjacent outer face of the drum 43 by a standard lock nut 48 and a compression spring 49 operative between the seal 47 and nut 48.

In order to further maintain the drum 43 in a position with its teeth engaging the gear 42, spacing means in the form of an annular projection 50 is secured to the surface of the end wall 17 for abutment against the associated base wall of drum 43. A similar projection 51 is formed or otherwise connected to the inner surface of the wall of casing 14, the peripheral surface of which acts as a bearing surface for the associated drum wall to facilitate its rotation within the subchamber 20.

In view of the foregoing construction and arrangement, rotation of the wheel 11 rotates the drum 43 through the connection effected by the hub cap 46 and shaft 45. Due to the connection of the drum 43 to the shaft 27 through the gears 42 and 44, the case 24 is concurrently rotated carrying with it the wobble plate 38 through the connection effected by the bellows 41 and the mass 25 connected to the plate 38 through the spokes 37. So long as the rate of this rotation of the wheel 11 (i.e., its angular deceleration) is in the proper relation or preestablished norm to its linear deceleration (i.e., movement of the axle 10 relative to the surface over which the wheel 11 is rolling), the case 24, wobble plate 38 and mass 25 rotate as a unit.

Upon deviation of such acceleration as occasioned by skidding, however, the wheel 11, shafts 45 and 27, and case 24 cease rotation while the mass 25 through inertia tends to continue. Since relative rotation between the mass 25 and wobble plate 38 is restricted by the bellows 41, this results in a linear movement of the wobble plate 38 on the shaft 27. It is this movement of the wobble plate 38 that is used to actuate an associated control 52 operatively connected to the pressure regulating device of the associated brake system through any conventional means.

In order to detect such linear movement of the wobble plate 38 on the shaft 27, an interconnecting link 53 is pivotally mounted to relatively stationary structure of the casing 14 such as the wall 22 of partition 19 about an axis 54. At one of its ends the link 53 terminates in a clevis 55 overlying and surrounding a marginal edge portion of the plate 38 normally disposed in spaced relation therewith and corresponding to the non-skid condition of the wheel 11. At its opposite end the link 53 terminates in a contact element 56 normally disposed in a neutral position between actuating elements 57 and 58 of control 52. Upon linear movement of the wobble plate 38 on the shaft 27 as described, the link 53 is thereby pivoted about its axis 54 and element 56 engages the control actuating element 58 for adjustment of the pressure regulating device of the brake system accordingly.

As indicated above, the control 52 may be mechanical, electrical, hydraulic, etc., all well known to the art. So far as the present invention is concerned, the only requirement is that this control 52 is responsive to movement of the link 53 as described to adjust the pressure regulating device of the brake system in proportion to the deviation of the angular deceleration of the wheel 11 with respect to its linear deceleration.

In the embodiment illustrated the control 52 is a booster type valve by which the forces generated by movement of the wobble plate 38 are hydraulically or pneumatically amplified to move the valve spool 59 so that force feedback into the plate 38 is insignificant compared to the forces generated by the mass 25. The control or valve 52 controls an associated main brake metering valve which controls the large flow rates required for braking the vehicle with which the wheel 11 is associated and is located remote from the wheel axle 10. Thus, the large hydraulic lines are not housed within the axle 10. When actuated by movement of the wobble plate 38 as described, the valve 52 meters the fluid flow to the main metering valve modulating its output pressure (i.e., the brake pressure).

More specifically, a fluid feed line 60 from a conventional fluid pressure source or supply (not shown) enters the valve 52 through ports 61 and 62 normally in communication with the elements 57 and 58 through individual passages 63 and 64 in the valve spool 59. With the contact element 56 in its neutral or normal position, the fluid pressure at elements 57 and 58 is equal and balanced. The ports 61 and 62 are also at this time in communication with the chambers 65 and 66 at opposite ends of the spool 59 through passages 67 and 68, respectively.

A fluid outlet line 69 connected to the main brake metering valve (not shown) is connected to the valve 52 through ports 70 and 71, one located on either side of the port 62. The port 70 is normally in communication with a return line 72 to the fluid supply from the valve 52 through a chamber 73 in the spool 59, and the port 71 is blocked from communication with a similar chamber 74 in the spool 59 that connects the port 62 with the line 64. The return line 72 is in constant communication with the interior of the casing 14 through a port 75 therein located within the subchamber 21.

The normal fluid flow through the valve 52 is therefore ineffective on the main brake metering valve. Fluid from the supply flows equally through the elements 57 and 58 into the subchamber 21 and back to the supply through port 75 and line 72. At the same time, this fluid flows equally into the chambers 65 and 66 to maintain the spool 59 in a neutral position whereby fluid in the line 69 from the main brake metering valve passes ineffectively through the chamber 73 and back to the supply through return line 72.

However, upon movement of the wobble plate 38 and the concurrent pivoting of the link 53 as above described, contact element 56 is moved out of its normal position with respect to the elements 57 and 58 creating an imbalance of pressure therein. An imbalanced fluid condition is simultaneously created in the chambers 65 and 66 causing the movement of the spool 59 accordingly. The chambers 73 and 74 in the spool 59 are thereby proportionately adjusted with respect to their associated ports 70 and 71 directing a proportional fluid flow between feed line 60 and line 69 to the main brake metering valve.

While a particular embodiment of the invention has been hereinabove illlustrated and described, it will be apparent to those skilled in the art that various changes and modifications may be made without departing from the invention. It is intended to cover in the appended claims all such changes, modifications and equivalents as fall within the true spirit and scope of this invention.

What is claimed is:

1. An anti-skid device for vehicles mounted on wheels and having a pressure operated brake system including a pressure regulator therefor associated with said wheels comprising:
   a mechanism sensitive to deviations in the linear and angular decelerations of at least one of said wheels from a preestablished norm,
      said mechanism including a composite linear and angular accelerometer connected to at least one of said wheels for rotation in unison therewith and for limited lateral movement relative thereto; and a control responsive to said lateral movement operatively connected to said pressure regulator.

2. The device of claim 1 wherein said accelerometer includes a mass and a slidable connection between said mass and at least one of said wheels for the movement of said mass in different planes while rotating in unison with each of its associated wheels.

3. The device of claim 1 wherein said accelerometer includes a hollow case; engagement means between said case and at least one of said wheels for constant rotation of the former with the latter; and a mass disposed within said case and slidably mounted with respect to said engagement means, said mass being connected to said engagement means for constant rotation in unison therewith.

4. The device of claim 1 wherein said control includes metering means for the operation of said pressure regulator in direct proportion to said lateral movement.

5. The device of claim 1 wherein said control comprises a valve operative to direct fluid from a fluid supply to said pressure regulator at a pressure in direct proportion to said lateral movement.

6. The device of claim 1 wherein said mechanism and said control are mounted with stationary supporting structure for their associated wheel.

7. The device of claim 3 wherein said engagement includes a pair of shafts one connected to at least one of said wheels and the other to said case and coacting gears in constant mesh interconnecting said shafts.

8. The device of claim 3 wherein said engagement means includes a shaft, a wobble plate slidably mounted on said shaft, and universally mounted connection means between said shaft and said wobble plate.

9. The device of claim 8 including a resilient connector between said case and said wobble plate.

10. The device of claim 8 including a resilient centering connector between said shaft and said mass.

11. The device of claim 7 wherein said one shaft is disposed coaxially of its associated wheel and said other shaft is disposed at right angles thereto.

12. The device of claim 7 including a wobble plate slidably mounted on said other shaft, and a torsion resisting member interconnecting said wobble plate and said case.

References Cited

UNITED STATES PATENTS

| | | | |
|---|---|---|---|
| 2,491,666 | 12/1949 | Keller | 188—181 |
| 2,920,924 | 1/1960 | Reswick | 137—48 X |
| 2,964,048 | 12/1960 | Mortimer | 303—24 X |
| 3,042,343 | 7/1962 | Cooke | 137—45 X |
| 3,059,973 | 10/1962 | Parshall | 303—21 |

CLARENCE R. GORDON, *Primary Examiner.*